(12) United States Patent
Smith

(10) Patent No.: US 7,836,821 B2
(45) Date of Patent: Nov. 23, 2010

(54) FUN DIPPER

(76) Inventor: Bryan Daniel Smith, 11846 Prairie Harvest Ct., Parker, CO (US) 80134

( * ) Notice: Subject to any disclaimer, the term of this patent is extended or adjusted under 35 U.S.C. 154(b) by 584 days.

(21) Appl. No.: 12/228,074

(22) Filed: Aug. 16, 2007

(65) Prior Publication Data

US 2009/0255417 A1 Oct. 15, 2009

(51) Int. Cl.
*A47J 43/28* (2006.01)
*A47J 37/00* (2006.01)

(52) U.S. Cl. .............. 99/323; 99/426; 99/440; 99/450; 210/465; 210/470

(58) Field of Classification Search .......... 99/323, 99/279, 426, 440, 450; 210/465, 470; 220/4.24, 220/4.21; 294/118, 103.1, 119.1
See application file for complete search history.

(56) References Cited

U.S. PATENT DOCUMENTS

| | | | |
|---|---|---|---|
| 291,950 A | 1/1884 | Stettheimer et al. | |
| 453,972 A | 6/1891 | Gray | |
| 812,312 A | 2/1906 | Ward | |
| 829,652 A | 8/1906 | Johnson | |
| 880,190 A | 2/1908 | Von Bultzingslowen | |
| 1,334,169 A | 3/1920 | Royer | |
| 1,367,568 A | 2/1921 | Smith | |
| 1,601,613 A | 9/1926 | Fenyves | |
| 1,648,906 A | 11/1927 | Lubrano | |
| 2,021,800 A | 11/1935 | Melish | |
| 2,034,733 A | 3/1936 | Wilkins | |
| 2,092,510 A | 9/1937 | Haut | |
| 2,570,521 A | 10/1951 | Chester | |
| 2,691,877 A | 10/1954 | Frolich | |
| 2,795,119 A | 6/1957 | Bair | |
| 3,154,418 A | 10/1964 | Lovell et al. | |
| 3,354,812 A | 11/1967 | Gorton, Jr. | |
| 3,946,652 A | 3/1976 | Gorin | |
| 5,806,409 A * | 9/1998 | Johnson et al. | 99/323 |
| 5,967,019 A | 10/1999 | Johnson et al. | |
| 6,595,110 B1 * | 7/2003 | Huang | 99/323 |
| 7,077,054 B1 | 7/2006 | Hurlock | |
| 7,090,269 B2 | 8/2006 | Kelsey | |
| 2005/0081385 A1 | 4/2005 | Ho | |
| 2006/0174494 A1 | 8/2006 | Wong | |
| 2007/0050986 A1 * | 3/2007 | Foster et al. | 30/142 |

\* cited by examiner

*Primary Examiner*—Reginald L Alexander
(74) *Attorney, Agent, or Firm*—Holland & Hart, LLP

(57) ABSTRACT

There is disclosed a dipper to hold a cookie or other material to submerge the cookie or material into milk or other desired liquid. In one embodiment, the dipper includes a perforated top cover, a perforated bottom spoon structure, a handle, and a slide mechanism to open an close the perforated top cover of the dipper.

20 Claims, 3 Drawing Sheets

FUN DIPPER

SUMMARY

In an embodiment, there is provided a dipper apparatus for submerging consumable food materials into a liquid. The dipper apparatus includes a perforated cup bottom having a top surface and a bottom surface with a plurality of perforations therebetween, a sidewall portion extending away from the top surface, and the top surface and the sidewall portion sized to contain the consumable food materials. The dipper apparatus further includes a handle having a first end and a second end, the first end of the handle in attachment with the perforated cup bottom, and a slide mechanism selectively disposed between the first end and the second end of the handle. The dipper apparatus further includes a top cover in attachment with the slide mechanism for selective positioning between a first location and a second location, the first location providing the top cover in engagement with the sidewall of the perforated cup bottom to prevent the consumable food from escaping the perforated cup bottom, and the second location providing the top cover in disengagement with the sidewall of the perforated cup bottom to allow the consumable food to be removed from the perforated cup bottom.

In another embodiment, there is provided a dipper apparatus to hold a cookie for submersion into, and removal from, a liquid. The dipper apparatus includes a perforated top cover and a perforated bottom spoon structure sized to contain the cookie therein. A handle is provided in connection with the perforated bottom spoon structure to allow selective positioning of the cookie into the liquid and into the mouth of a user. A slide mechanism is provided to selectively open and close the perforated top cover of the dipper to allow selective positioning of the cookie into the liquid and into the mouth of a user.

In yet another embodiment, a dipper apparatus for submerging consumable food materials into a liquid The dipper apparatus includes a perforated cup bottom having a top surface and a bottom surface with a plurality of perforations therebetween, a sidewall portion extending away from the top surface, the top surface and the sidewall portion including a thinned front lip portion sized to allow a user to eat the consumable food directly off of the top surface, and the top surface and the sidewall portion sized to contain the consumable food materials The dipper apparatus includes a handle having a first end and a second end, the first end of the handle in attachment with the perforated cup bottom. The dipper apparatus includes a top cover operably connected with the handle for selective positioning between a first location and a second location, the first location providing the top cover in engagement with the sidewall of the perforated cup bottom to prevent the consumable food from escaping the perforated cup bottom, and the second location providing the top cover in disengagement with the sidewall of the perforated cup bottom to allow the consumable food to be removed from the perforated cup bottom.

Other embodiments are also disclosed.

BRIEF DESCRIPTION OF THE DRAWINGS

Illustrative embodiments of the invention are illustrated in the drawings, in which.

DETAILED DESCRIPTION

In an embodiment, there is disclosed a dipper to hold a cookie or other material to submerge the cookie or material into milk or other desired liquid. In one embodiment, the dipper includes a perforated top cover, a perforated bottom spoon structure, a handle, and a slide mechanism to open and close the perforated top cover of the dipper.

Generally, the purpose of the dipper is to hold a cookie or other material(s), allowing one to "dip" or submerge the material(s) into milk or other desired liquid, and, if desired, consume the material(s).

Figure 1:
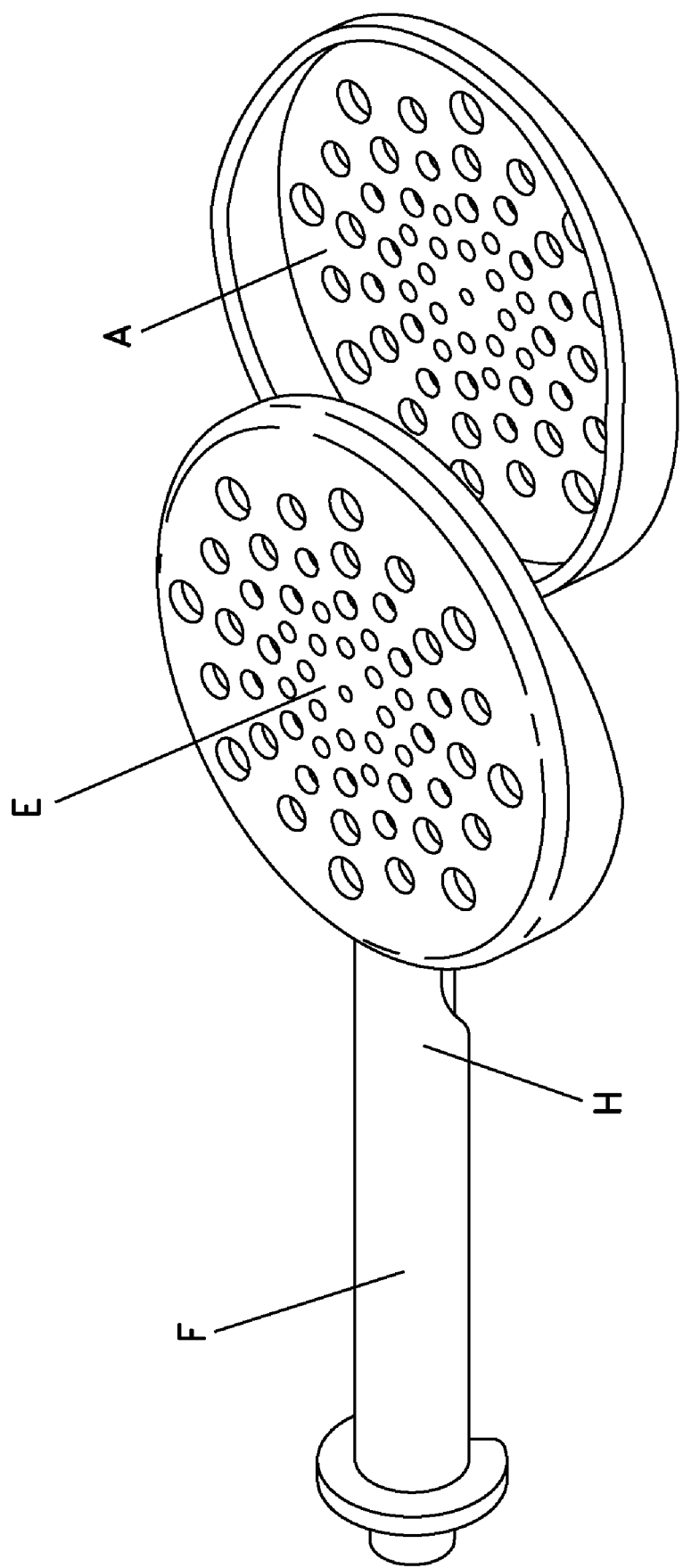
FIG. 1 illustrates how the dipper is opened so that material(s) can be placed into the dipper.
Figure 2:
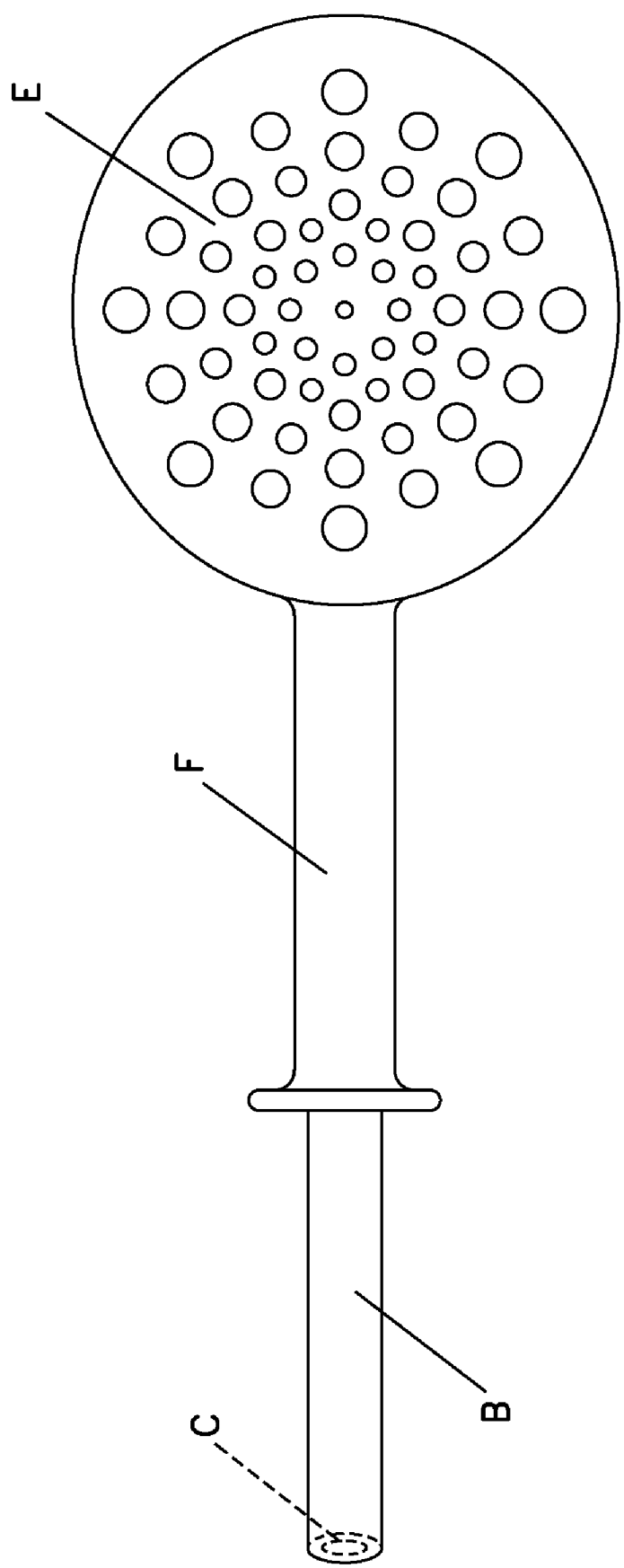
FIG. 2 illustrates how the dipper is closed so that material(s) can be dipped or submerged into liquid.
Figure 3:
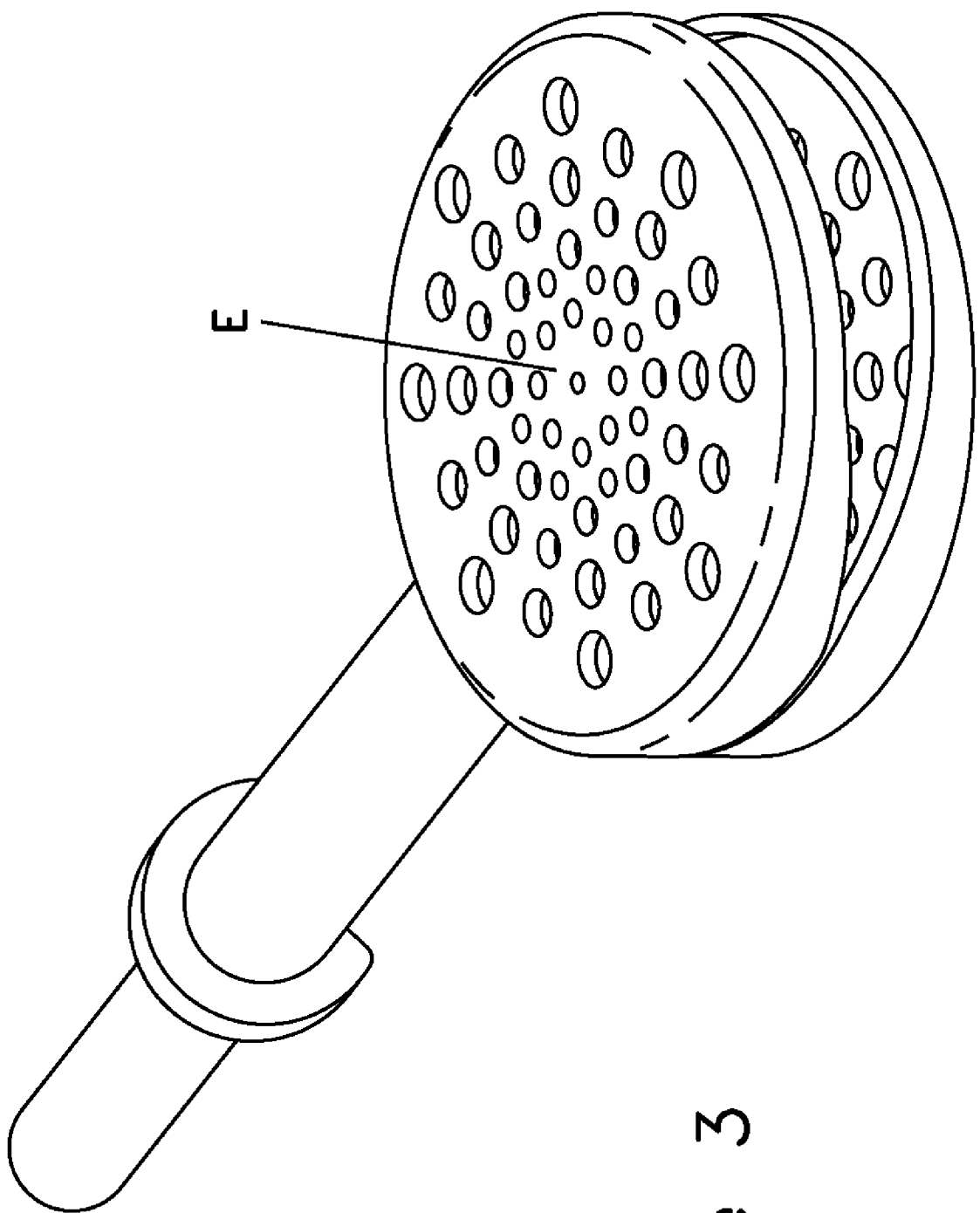
FIG. 3 also illustrates, from a different angle, how the dipper is closed so that material(s) can be dipped or submerged into liquid.

The dipper, as illustrated in FIGS. 1-3, may include four main components of a perforated top cover, a perforated cup bottom, a handle, and a slide mechanism.

The perforated top cover encloses the material(s) in the perforated "cup" like bottom so that the material(s) can be dipped or submerged into liquid preventing the majority of the material(s) from escaping the enclosure (reference letter E of FIGS. 1-3). The perforated top cover can be opened and closed allowing for material(s) to be both placed in and removed from the perforated "cup" like bottom.

As seen in FIGS. 1-3, and in one embodiment, the cover (reference letter E) allows liquid to penetrate through the perforated holes and be absorbed by the material(s). The shape, depth, and diameter of the perforated top cover is designed to fit over the perforated "cup" like bottom creating an environment that prevents the majority of the material(s) from escaping.

In an embodiment, the perforated "cup" like bottom has a "cup" like structure on the end as seen in FIG. 1, with reference to reference letter A, that is used to hold material(s) while dipping or submerging the end of the dipper into liquid. Additionally, the "cup" like bottom on the end will be shaped as, and will act like a "spoon" that can, if desired, be consumed off of when the perforated top cover is pulled back.

As seen in FIG. 1, with reference to reference letter A, the perforated "cup" like bottom looks and functions like a "spoon" to hold the material(s). Perforated holes allow liquid to penetrate through the perforated "cup" like bottom and be absorbed by the material(s). The perforated "cup" like bottom, if desired, can also be used like a spoon to consume the material(s) item(s) directly off of the "cup" like bottom.

The shape, depth, and diameter of the perforated "cup" like bottom are variable based on the intended material(s) to be contained, but it typically is the size and shape of a common cookie.

In an embodiment, the handle portion of the dipper is used to hold the dipper and act as a guide to prevent the slide mechanism from separating from the dipper (reference letter B of FIG. 2). The slide mechanism attaches around the handle. The handle serves as the base for the perforated "cup" like bottom.

As shown on reference letter B of FIG. 2, the handle supports the perforated "cup" like bottom and serves as the guide for the slide mechanism. The handle is how the dipper is held.

The handle has guides and a raised edge (reference letter C of FIG. 2) that prevents the perforated top cover from sliding off the handle.

The shape and length of the handle is variable based on the desired hand size of the intended party, typically the handle is sized to be easily held by a child.

The end of the handle allows for a "custom design." For example, the end of the handle can be designed with a plastic dinosaur, plastic dog, plastic cat, or any intended character or intended item.

In an embodiment, the slide mechanism is used to open and close the perforated top cover of the dipper. The slide mechanism allows for both forward and backward movement of the perforated top cover.

As shown in FIGS. 1 and 2, with reference to reference letter F, the slide mechanism allows one to "slide" the perforated top cover back and forth on the dipper. The size of the slide mechanism is variable and based on the diameter of the handle.

As seen on FIG. 1, with reference to reference letter H, the area where the perforated top cover and slide mechanism meet is angled so that when the dipper is closed, the perforated top cover does not slide to far forward.

In an embodiment, the dipper can be made out of plastic, and through many methods, including injection molding. In another embodiment, the dipper can be made out of metal. In an embodiment, the dipper can be made out of wood.

The invention claimed is:

1. A dipper apparatus for submerging consumable food materials into a liquid, the dipper apparatus comprising:
a perforated cup bottom having a top surface and a bottom surface with a plurality of perforations therebetween, a sidewall portion extending away from the top surface, the sidewall portion having an upper surface at a first given height from the top surface, a front lip portion having an upper surface at a second given height from the top surface, the upper surface of the front lip portion disposed at a lower height than the upper surface of the sidewall portion, the second given height of the front lip portion being less than the first given height of the sidewall portion so as to facilitate delivery of the consumable food from the top surface, and the top surface and the sidewall portion sized to contain the consumable food materials;
a handle having a first end and a second end, the first end of the handle in attachment with the perforated cup bottom, and a slide mechanism selectively disposed between the first end and the second end of the handle; and
a top cover in attachment with the slide mechanism for selective positioning between a first location and a second location, the first location providing the top cover in engagement with the sidewall of the perforated cup bottom to prevent the consumable food from escaping the perforated cup bottom, and the second location providing the top cover in disengagement with the sidewall of the perforated cup bottom to allow the consumable food to be removed from the perforated cup bottom.

2. A dipper in accordance with claim 1, wherein the top surface, the perforations, and the sidewall portion of the perforated cup bottom are sized to contain a cookie.

3. A dipper in accordance with claim 1, wherein the top surface, the perforations, and the sidewall portion are sized to allow a user to eat the consumable food directly off of the perforated cup bottom.

4. A dipper in accordance with claim 1, wherein the top cover has a second top surface and a second bottom surface with a second plurality of perforations therebetween.

5. A dipper in accordance with claim 4, wherein the top cover has a second sidewall portion extending away from the second bottom surface and sized to selectively engage the sidewall portion of the perforated cup bottom by repositioning the slide mechanism.

6. A dipper in accordingly with claim 1, wherein the slide mechanism substantially surrounds the handle and attaches directly to the top cover.

7. A dipper in accordance with claim 6, wherein the handle includes a raised edge adjacent the second end, and the raised edge and the slide mechanism sized to prevent the top cover from sliding off of the handle.

8. A dipper in accordance with claim 6, wherein the top cover and the slide mechanism include an angled stop portion to position the top cover with respect to the perforated bottom cover.

9. A dipper in accordance with claim 1, wherein the perforated cup bottom, the handle, and the top cover are formed of a plastic material.

10. A dipper in accordance with claim 1, wherein the perforated cup bottom, the handle, and the top cover are formed of a wood material.

11. A dipper in accordance with claim 1, wherein the perforated cup bottom, the handle, and the top cover are formed of a metal material.

12. A dipper apparatus to hold a cookie for submersion into, and removal from, a liquid, the dipper apparatus comprising a perforated top cover and a perforated bottom spoon structure sized to contain the cookie therein, the perforated bottom spoon structure having a top surface and a bottom surface with a plurality of perforations therebetween, a sidewall portion extending away from the top surface, the sidewall portion having an upper surface at a first given height from the top surface, a front lip portion having an upper surface at a second given height from the top surface, the upper surface of the front lip portion disposed at a lower height than the upper surface of the sidewall portion, the second given height of the front lip portion being less than the first given height of the sidewall portion so as to facilitate delivery of the consumable food from the top surface, and the top surface and the sidewall portion sized to contain the consumable food materials, a handle in connection with the perforated bottom spoon structure to allow selective positioning of the cookie into the liquid and into the mouth of a user, and a slide mechanism to selectively open and close the perforated top cover of the dipper to allow selective positioning of the cookie into the liquid and into the mouth of a user.

13. A dipper in accordance with claim 12, wherein the perforated top cover, the perforated bottom spoon structure, the handle, and the slide mechanism are sized to allow the user to eat the consumable food directly off of the perforated cup bottom.

14. A dipper in accordance with claim 12, wherein the slide mechanism substantially surrounds the handle and attaches directly to the perforated top cover.

15. A dipper in accordance with claim 12, wherein the handle includes a raised edge sized to prevent the perforated top cover from sliding off of the handle.

16. A dipper in accordance with claim 12, wherein the perforated top cover and the slide mechanism include an angled stop portion to position the perforated top cover with respect to the perforated bottom spoon structure.

17. A dipper in accordance with claim 12, wherein the perforated top cover, the perforated bottom spoon structure, the handle, and the slide mechanism are formed of a plastic material.

18. A dipper in accordance with claim 12, wherein the perforated top cover, the perforated bottom spoon structure, the handle, and the slide mechanism are formed of a wood material.

19. A dipper in accordance with claim 12, wherein the perforated top cover, the perforated bottom spoon structure, the handle, and the slide mechanism are formed of a metal material.

20. A dipper apparatus for submerging consumable food materials into a liquid, the dipper apparatus comprising:

a perforated cup bottom having a top surface and a bottom surface with a plurality of perforations therebetween, a sidewall portion extending away from the top surface, the sidewall portion having an upper surface at a first given height from the top surface, a front lip portion having an upper surface at a second given height from the top surface, the upper surface of the front lip portion disposed at a lower height than the upper surface of the sidewall portion, the second given height of the front lip portion being less than the first given height of the sidewall portion, the front lip portion sized to allow a user to eat the consumable food directly off of the top surface and facilitate delivery of the consumable food from the top surface, and the top surface and the sidewall portion sized to contain the consumable food materials;

a handle having a first end and a second end, the first end of the handle in attachment with the perforated cup bottom; and a top cover operably connected with the handle for selective positioning between a first location and a second location, the first location providing the top cover in engagement with the sidewall of the perforated cup bottom to prevent the consumable food from escaping the perforated cup bottom, and the second location providing the top cover in disengagement with the sidewall of the perforated cup bottom to allow the consumable food to be removed from the perforated cup bottom.

* * * * *